Sept. 1, 1931.   H. C. TITTLE   1,821,775
FILM CONTROLLED SWITCH
Filed Nov. 7, 1929

Inventor
Hulbert C. Tittle.
by Charles E. Mullan
His Attorney.

Patented Sept. 1, 1931

1,821,775

UNITED STATES PATENT OFFICE

HULBERT C. TITTLE, OF CHICAGO, ILLINOIS, ASSIGNOR TO GENERAL ELECTRIC COMPANY, A CORPORATION OF NEW YORK

FILM CONTROLLED SWITCH

Application filed November 7, 1929. Serial No. 405,517.

My invention relates to apparatus employing a film of the strip or motion picture type and more particularly to such apparatus in which the actuation of an electric switch is controlled by the film. It is the object of my invention to provide an improved apparatus of this character in which the switch contacts are thoroughly insulated from the rest of the apparatus and are isolated from the film to more fully avoid fire hazard. A further object of my invention is the provision of apparatus of this character which is simple in construction, reliable in operation and economical of manufacture.

My invention will be better understood from the following description taken in connection with the accompanying drawings, and its scope will be pointed out in the appended claims.

Figure 1:
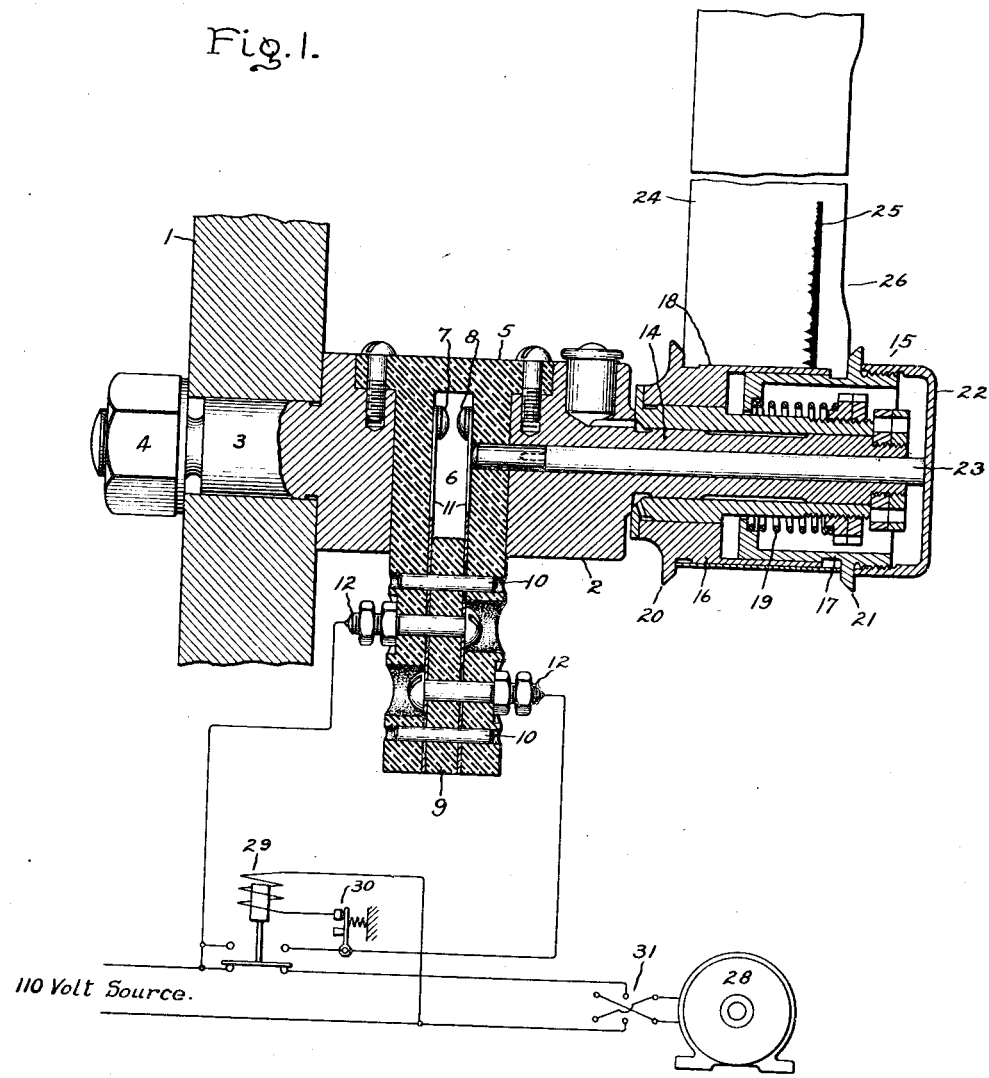
Figure 2:
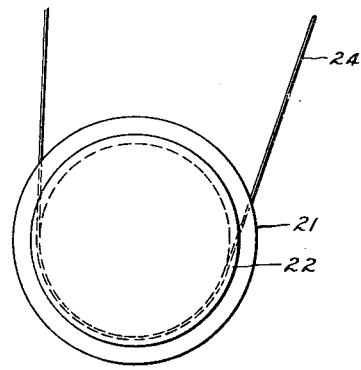

Referring to the drawings, Fig. 1 is a combined cross sectional view drawn to an enlarged scale and circuit diagram of apparatus involving my invention, and Fig. 2 is an end view of the film engaging roller.

The apparatus which I have devised is particularly adapted for use as a part of a film phonograph employing a film bearing a sound record which film extends for some distance beyond the end of the sound record so as to remain attached to the take-up reel. When the end of the sound record is reached the film driving mechanism is stopped automatically preparatory to being operated in the reverse direction to rewind the film without removing the reels from the machine. My invention involves a film controlled switch mechanism which in the present example controls the driving motor of a film phonograph although obviously it may be used for various other purposes.

To the frame 1 of the film phonograph the shaft or stud 2 is secured by the reduced portion 3 and the nut 4. Mounted in a transverse bore in the stud is the insulation member 5 having the central opening 6 containing the fixed and movable switch contacts 7 and 8 respectively. The opening 6 is closed by the plug 9, dowel pins 10 being employed to retain in position the plug and the contact springs 11. Circuit connections are made to these springs by means of the terminal screws 12.

On the outer reduced portion 14 of the stud 2 is rotatably mounted the film engaging idler or roller 15. This is shown as a transversely divided roller comprising the two telescoping portions 16 and 17, the former portion having a bearing on the reduced stud 14 and having the film engaging cylindrical part 18. The latter portion slides axially in part 18, being resiliently moved toward portion 16 by the coil spring 19. Portions 16 and 17 have the shallow bevelled edge flanges 20 and 21 respectively for engaging the edges of the film which during the normal operation of the machine holds the portion 17 in open circuit position against the tension of spring 19. Inward movement of portion 17 is communicated to switch contact 8 through the end cap 22 and the rod 23 which is slidably mounted axially of the stud and which has an insulation section at its inner end. The film 24 which in the present example is shown without sprocket tooth perforations has the sound record 25 thereon, the position of which on the film is immaterial to the present invention, and has its edge cut away at 26 adjacent the end of the sound record, the actual width of the particular film shown being 16 mm in as much as the apparatus is drawn at a greatly enlarged scale.

In the present illustration the switch controls the operation of the motor 28 which drives the film phonograph. This control is through the relay 29 and hand switch 30, the operation being as follows. Suppose the machine to be in operation, being driven forwardly by the motor 28 connected to a suitable source of current supply. Concurrently with the passage of the end of the sound record through the reproducer the cut away portion 26 of the film in passing the roller 15 allows the spring to shift the roller portion 17 and push rod 23 to the left sufficiently to move contact 8 to closed circuit position. The winding of relay 29 is energized through hand switch 30 and the motor circuit is opened whence the machine comes to rest. The relay 29 preferably has back contacts connected in shunt with the terminals 12 of the switch to lock the relay in operated position until released by the hand switch 30. The motor may then be operated in the reverse direction by throwing the reversing switch 31 to rewind the film.

In accordance with the construction which I have devised both contacts of the switch controlled by the film are completely insulated from the apparatus. The contacts also are completely enclosed by insulating material and are removed from the immediate proximity of the film of which the material ordinarily employed is highly inflammable. As so constructed I am able to operate the motor, relay and switch directly on the ordinary 110 v. house lighting circuit without danger of an operator of the apparatus receiving a shock and with no danger of the film accidentally becoming ignited from any sparks or arcing at the switch contacts. Since the flanges 20 and 21 which normally engage the opposite edges of the film are shallow and have their inner edges beveled, it being noted that the inner end of the bevel is but slightly larger than the film engaging face of part 18, a relatively slight disturbance in the proper movement of the film will permit the closing of the switch and the shutting down of the machine. Such a disturbanace may arise from an improper threading of the machine, torn sprocket holes where perforated films are used, etc. and if the machine is not immediately stopped a long length of film often is torn up or the machine is damaged. By reason of the construction which I have shown and described the switch is highly sensitive to such disturbances.

What I claim as new and desire to secure by Letters Patent of the United States is:

1. In apparatus of the character described, a stud, a roller mounted thereon adapted to support a film of the motion picture type, said roller having flanges adapted to engage the opposite edges of the film, one of said flanges being axially movable, a spring tending to move said flange toward the other flange, a plurality of insulated switch contacts supported by said stud, and a switch operating member connecting one of said contacts with said one flange.

2. In apparatus of the character described, a stud, a roller mounted thereon adapted to support a film of the motion picture type, said roller having flanges adapted to engage the opposite edges of the film, one of the flanges being movable axially, a spring tending to move said flange toward the other flange, a pair of insulated switch contacts, a member supporting said contacts secured to said stud, and an operating rod extending through the stud from the movable flange to the contacts.

3. In apparatus of the character described, a divided roller adapted to support a film, each part having a flange arranged to engage an edge of the film, a spring arranged to move one of said parts toward the other under the control of the film, a fixed stud on which said roller is journaled, a block of insulating material mounted in said stud, switch contacts enclosed thereby, and a switch operating rod extending longitudinally through said stud and operatively connecting one of said contacts with said movable roller part.

In witness whereof, I have hereunto set my hand this 5th day of October, 1929.

HULBERT C. TITTLE.